United States Patent [19]

Downing et al.

[11] Patent Number: 4,805,941

[45] Date of Patent: Feb. 21, 1989

[54] QUICK RELEASE WHEEL RETAINER

[75] Inventors: Verlon D. Downing; Timothy J. Dietz, both of Centerville, Ohio

[73] Assignee: Huffy Corporation, Miamisburg, Ohio

[21] Appl. No.: 914,531

[22] Filed: Sep. 30, 1986

Related U.S. Application Data

[63] Continuation of Ser. No. 742,689, Jun. 10, 1985, abandoned.

[51] Int. Cl.$^4$ .............................................. B62K 25/02
[52] U.S. Cl. .................................... 280/279; 280/288; 301/113
[58] Field of Search .................... 280/279, 289 R, 287, 280/288, 276, 278, 289 L; 301/111, 112, 113, 125; 24/232 R

[56] References Cited

U.S. PATENT DOCUMENTS

| 466,824 | 1/1892 | Gendron | 280/279 |
|---|---|---|---|
| 1,387,215 | 8/1921 | Wagner | 280/279 |
| 3,807,761 | 4/1974 | Brilando | 280/279 |
| 3,894,751 | 7/1975 | Fuhrman | 280/279 |
| 4,400,038 | 8/1983 | Hosokawa | 280/288 |

FOREIGN PATENT DOCUMENTS

| 607160 | 8/1960 | Italy | 24/232 |
| 7428 | of 1915 | United Kingdom | 280/288 |

Primary Examiner—John J. Love
Assistant Examiner—Everett G. Diederiks, Jr.
Attorney, Agent, or Firm—Biebel French & Nauman

[57] ABSTRACT

A quick-release wheel retainer consisting of a hooked-shaped member having a generally planar shaped tab attached thereto and extending outwardly therefrom approximately perpendicular to the hook-shaped member. The member is pivotally connected to a vertical drop-out of a bicycle front fork and the pivot connection is positioned directly above the drop-out slot such that, once in a locked position about a bicycle axle, the weight of the axle against the member causes the retainer to remain in that locked position.

6 Claims, 2 Drawing Sheets

QUICK RELEASE WHEEL RETAINER

CROSS-REFERENCE TO RELATED APPLICATION

This application is a continuation of U.S. application Ser. No. 742,689, filed June 10, 1985, now abandoned.

BACKGROUND OF THE INVENTION

The present invention relates to devices for retaining a bicycle wheel hub to the front fork of a bicycle and, more particularly, to devices for retaining a quick-release wheel hub to the front fork of a bicycle.

Quick-release hubs are well-known and are used on the wheels of better quality bicycles to facilitate their mounting on or removal from the bicycle frame. Typically, a quick-release hub comprises an axle having threaded ends, a large nut on one end, and a camming mechanism on the other end. The hub engages the drop-out slots of a front fork immediately inboard of the nut and camming mechanism, so that actuation of the camming mechanism causes the drop-outs to be clamped against the axle body.

A disadvantage of wheels having a quick-release hub is that it is not practical to use such a hub on frames having conventional wheel hub retaining systems, which are designed for use with conventional hubs retained on the fork by nuts. For example, one such system (shown in FIGS. 1 and 2 of the drawings) comprises a metal tab attached to the front fork of a bicycle to pivot outwardly from the drop-out to which it is attached in a plane parallel to the axis of the hub axle. The tab includes a hole which receives the bare, threaded end of a conventional axle. An end of the conventional axle is first inserted through the tab hole, the hub is then placed in the drop-out slots, and the hub is clamped against the fork by nuts.

To mount a quick-release hub on the fork of a bicycle having such a retainer, however, would require partial disassembly of the hub. The nut from one end of the axle would have to be removed to expose the stub end of the axle, since it would be necessary to pass the tab over the end of the axle so that the axle end extended through the hole in the tab.

Accordingly, there is a need for a wheel retainer which positively retains a wheel hub on the fork of a bicycle, and which can rapidly engage or disengage the axle of a quick-release hub, as well as a conventional hub.

SUMMARY OF THE INVENTION

The present invention is a quick-release wheel retainer which is pivotally attached to at least one vertical drop-out of a bicycle wheel fork. The retainer includes a hook-shaped member having a crook portion at one end shaped to partially encircle a wheel axle. The crook portion is sufficiently open to permit lateral engagement with or disengagement from the wheel axle. Thus, the hook-shaped member may be pivoted in a plane perpendicular to the axis of the wheel axle for engagement or disengagement. Since it is not necessary to pass the hook-shaped member over the end of the axle, the invention is well-suited for use with quick-release hubs.

In the preferred embodiment of the present invention, the hooked-shaped member is flat and is positioned to slide parallel to and adjacent to the vertical drop-out. One end of the member is pivotally attached to one of the vertical drop-out of a fork and the other end includes the crook portion. The crook portion is positioned such that when combined with the slot opening of the vertical drop-out, the axle is completely encircled.

The crook portion is shaped so that a portion of it extends beneath the axle when the axle is positioned within the drop-out slot and the hook m is pivoted into a locking position. Should the quick-release hub inadvertently become unlocked, the crook portion so positioned will support the axle and retain it within the slot.

Also in the preferred embodiment, the crook portion includes an integrally formed tab which extends at approximately a 90° angle to the plane of the hook-shaped member. This tab serves the dual purpose of providing a surface which can be easily grasped by a user to pivot the hook-shaped member, and acting as a stop which contacts the edge of a vertical drop-out when the hook-shaped member is accurately positioned in relation to the wheel axle and the vertical drop-out in the locked position. The hook-shaped member and the tab are preferably formed from a single, stamped steel part.

Accordingly, it is an object of the present invention to provide a quick-release wheel retainer which may be utilized with either a conventional or a quick-release hub, and to provide a quick-release retainer which prevents a bicycle wheel from accidentally disengaging from the vertical drop-outs should a quick-release hub inadvertently became unlocked.

Other objects and advantages of the invention will be apparent from the following description, the accompanying drawings and the appended claims.

DETAILED DESCRIPTION OF THE PREFERRED EMBODIMENT

Figure 1:
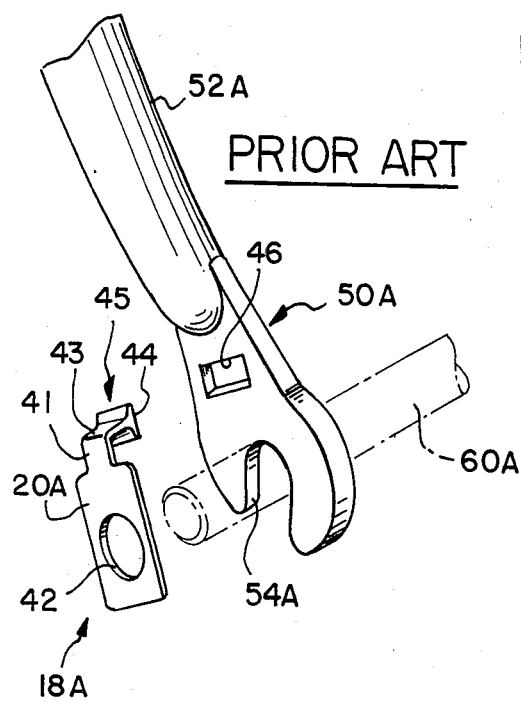
FIG. 1 is an exploded perspective view of a prior art wheel retaining system.
Figure 2:
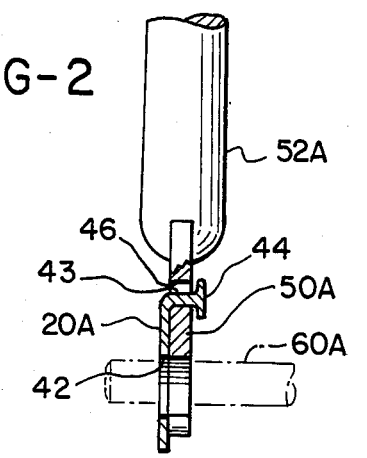
FIG. 2 is a fragmentary cross sectional view of the device of FIG. 1.

As illustrated in FIGS. 1 and 2, a prior art wheel hub retaining system, generally designated 18A, includes a bracket 20A formed from a single stamped steel part. The bracket 20A includes a one-piece planar member having an aperture 42 and a stem 41 formed therein. The stem 41 extends generally parallel from planar member 20A until merging with a T-shaped member, generally designated as 45.

The first portion 43 of T-shaped member 45 merges with stem 41 and extends approximately perpendicular to stem 41 until it merges with second portion 44. Second portion 44 of T-shaped member 45 is generally perpendicular to the plane of first portion 43 and generally parallel to the plane of bracket 20A.

As shown in FIG. 2, the conventional bracket 20A is attached to vertical drop-out 50A by T-shaped member 45. T-shaped member 45 extends through rectangular aperture 46 of drop-out 50A. Axle 60 extends through aperture 42 of conventional bracket 20A.

The operation of the conventional wheel hub retaining system 18A is as follows. Conventional bracket 20A is rotated perpendicular to, the plane of vertical drop-out 50A. T-shaped member 45 is inserted into rectangular aperture 46 while axle 60A is simultaneously inserted into aperture 42.

Once T-shaped member 45 has been inserted beyond side 52A of vertical drop-out 50A and axle 60 has been inserted into aperture 42, conventional bracket 20A is pivoted toward vertical drop-out 50A in a plane parallel to the axis of conventional axis 60A until the surfaces of bracket 20A and vertical drop-out 50A coincide.

Aperture 42 of bracket 20A completely encloses axle 60A, and counteracts any tendency for axle 60A to drop vertically downward out of slot 54A. As mentioned above, considerable time is required to perform such steps to disengage and reengage the conventional retainer with the axle, and even more time would be required to attach and remove a quick-release hub, thereby defeating its "quick-release" function.

Figure 3:
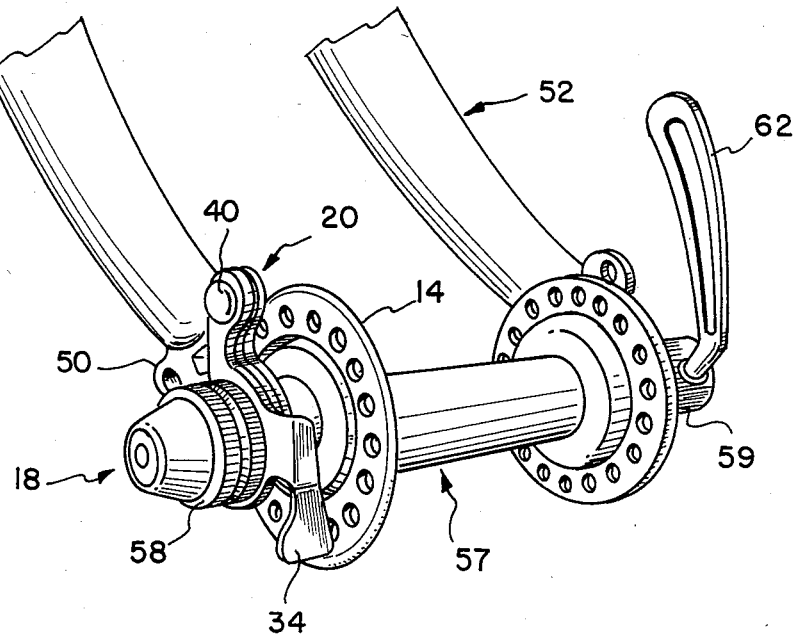
FIG. 3 is a partial perspective view of a preferred embodiment of the present invention utilized with a quick-release hub.
Figure 8:
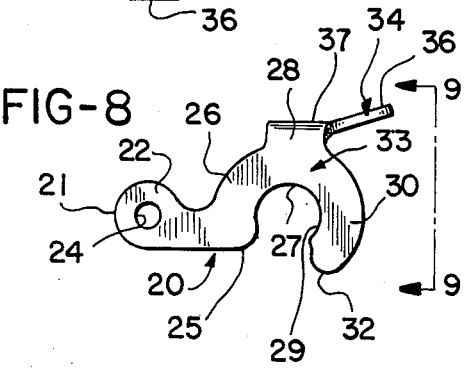
FIG. 8 is a side elevational view of the hook-shaped member of the preferred embodiment.
Figure 9:
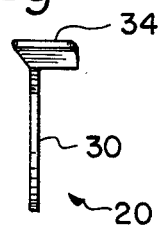
FIG. 9 is the view taken along line 9—9 of FIG. 8.

As shown is FIG. 3, the quick-release wheel retainer of the present invention, generally designated 18, includes a one-piece, hooked-shaped member 20 formed from stamped steel. As best illustrated in FIG. 8, the hook-shaped member 20 includes a generally flat member 22 having an aperture 24 formed proximate its end 21, an arcuate shaped top portion 26, a linear mid portion 28, and an arcuate bottom portion 30.

Bottom portion 30 terminates in a tip 32 so that the top portion 26, midportion 28, and bottom portion 30 combine to form a crook portion 33. The inner edges of the top portion 26, midportion 28, and bottom portion 30, denoted by reference numbers 25, 27, and 29, respectively, combine to form the inner periphery of the crook portion 33. The tip 32 of the bottom portion 30 is positioned to oppose the tip 35 of the top portion 26.

A tab 34 extends from midportion 28 and includes to planar sections 36, 37. Section 37 is perpendicular to mid portion 28 and section 36 is angled relative to section 37 to form a V-shape.

Figure 6:
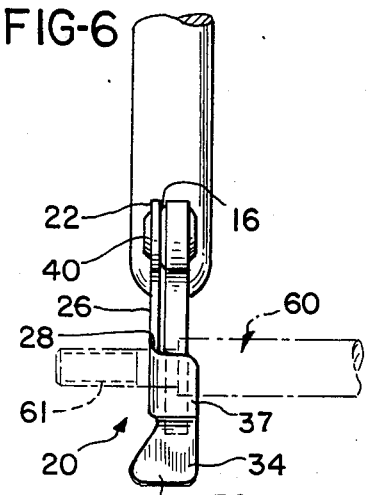
FIG. 6 is an end elevation of the preferred embodiment in the locked position.
Figure 7:
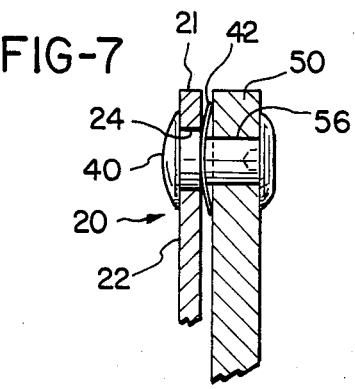
FIG. 7 is a detail in section taken along line 7—7 of FIG. 4.

As shown in FIGS. 6 and 7, the hook-shaped member 20 is pivotally attached to a vertical drop-out 50 by a rivet 40 and spring washer 42. The rivet 40 extends through aperture 24 and hole 56 of the drop-out 50, and the spring washer 42 is positioned between the hook-shaped member 30 and the flat outer surface of the drop-out 50 or alternatively between rivet 40 and hook-shaped member 20.

Figure 4:
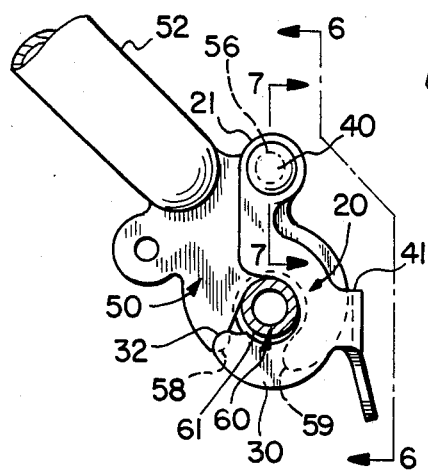
FIG. 4 is a partial side elevation illustrating the preferred embodiment of FIG. 3 locking a wheel axle in the vertical drop-out slot.
Figure 5:
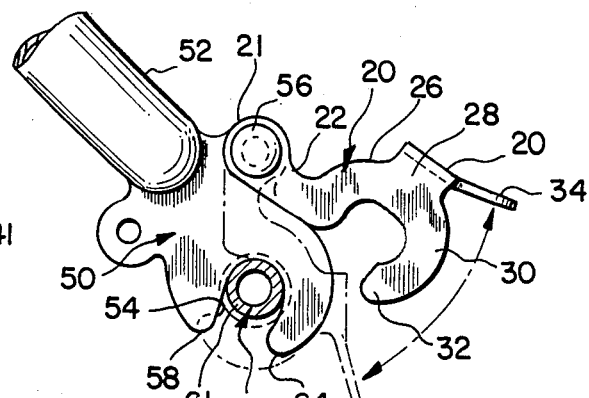
FIG. 5 is a view similar to FIG. 4 illustrating the preferred embodiment in the unlocked position and the locked position in phantom.

As shown in FIGS. 3–5, the wheel retainer 18 is used to retain a quick-release hub 57 in the vertical drop-outs 50 of a front fork 52. The axle 60 of the hub 57 engages the slots 54 of the fork 52, and the hub 57 is locked within the slots 54 by the compressive force exerted by end pieces 58, 59, which is applied or released by a mechanism of well-known design (not shown) in end piece 59.

The operation of the wheel retainer 10 is as follows. As shown in FIG. 5, to unlock the retainer 18, the hook-shaped member 20 is pivoted in a counter-clockwise direction so that crook portion 33 is out of registry with drop-out slot 54. The member 20 is held in this unlocked position by the spring washer 42 (FIG. 7). When the member 20 is in this unlocked position, the slot 54 is exposed to receive the axle 60 of quick-release hub 57. It should be noted that the invention and this procedure can be used with a conventional wheel hub (not shown) having threaded ends which is retained on the fork 52 by nuts threaded on the ends.

Once the axle 60 is in place within the slot 54, the retainer 18 is locked by pivoting the hook-shaped member 20 clockwise until the crook portion 33 encircles the quick-release skewer 61 of the axle and tip 34 overlaps end portion 58 of drop-out 50 (FIG. 4).

As best shown in FIG. 6, further pivotal rotation of member 20 is prevented by engagement of the tab section 35 with the adjacent portion of the drop-out 50. The hub 57 may be actuated to lock against the front fork 52. The hub 57 is now securely mounted on the front fork 52.

The member 20, in combination with the shape of slot 54 in the drop-out 50, completely encircles the axle 60. The tendency of the axle 60 to drop vertically downward out of the slot 54, should the hub 57 be released inadvertently, is counteracted by the portion 30 of the member 20, which extends directly beneath skewer 61 of the axle. When in the locked position, portion 30 is also directly beneath the pivot connection made by rivet 40 so that the vertically downward force of the skewer 61 against portion 30 does not cause the member 20 to pivot. The member 20 is also held in the locked position by the frictional forces exerted by spring washer 42.

To separate front hub 57 from the front fork 52 of the bicycle, the quick-release hub is disengaged by rotating quick-release hub lever 62 to the unlocked position. To unlock retainer 18, tab 34 of hook-shaped member 20 is pivoted away from axle 60 thereby pivoting hook-shaped member 20 counterclockwise about rivet 40 until end 32 (see FIG. 5) has cleared tip 64 of vertical drop-out 50. Once hook-shaped member 20 is so positioned, quick-release hub 57 is allowed to be disengaged from vertical drop-out 50 thereby disengaging axle 60 from slot 54.

With the quick-release retainer 18, should the quick-release hub 57 become unlocked during use, road vibrations and other forces which might tend to alter the position of the hook-shaped member 20 in relation to wheel axle 60 are overcome by gravity, which applied by the axle 60 through portion 30, causes the member 20 to remain in the locked position about wheel axle 60.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A quick-release wheel retainer comprising:
   a bicycle front fork having at least one drop-out including a substantially vertical slot;
   a hook-shaped member having an open, crook portion being arcuately-shaped and including top and bottom portions forming an arcuate inner periphery extending greater than 180°;
   means for pivotally connected said top portion of said member to said drop-out at a point directly vertically above said slot such that said member pivots in a plane perpendicular to a central axis of axis of an axle extending through said drop out to a position wherein said crook portion is in registry with said slot to close an open end of said slot retain an axle therein; and said inner periphery being shaped such that said bottom portion curves upwardly toward said top portion, when said member is in registry with said slot, sufficiently to require a slight upward movement of said axle to enable said crook portion to be pivoted out of registry with said slot, whereby gravity acting upon a retained axle against said member urges said member to remain in registry with said slot.

2. The quick-release wheel retainer of claim 1 further comprising a generally planar tab projecting perpendicular from said hook shape member.

3. The quick-release wheel retainer of claim 2 wherein said tab further comprises at least two planar portions generally having a V-shape, said first portion of said V being connected to said retainer, and said second portion of said V being adapted to be grasped by a user to facilitate movement of said member between a locked and an unlocked position.

4. The retainer of claim 1 wherein said arcuate top portion includes a flange attached to said drop-out by said connecting means; and said inner periphery being shaped such that a lower tip thereof is spaced from an upper tip thereof a distance less than a diameter of said inner periphery.

5. The retainer of claim 1 wherein said connecting means includes a rivet extending through said flange and said drop-out at a point substantially vertically above said slot, and a spring washer mounted on said rivet and positioned between said flange and said drop-out.

6. A quick-release wheel retainer comprising:

a bicycle front fork having at least one drop-out including a substantially vertical slot;

a hook-shaped member having an open, crook portion being arcuate-shaped and including top and bottom portions forming an arcuate inner periphery extending greater than 180°, said hook-shaped member including an arcuate top portion having a flange, a linear mid portion, and an arcuate bottom portion, said top, mid- and bottom portions forming said inner periphery;

means for pivotally connecting said flange of said member to said drop-out at a point directly vertically above said slot such that said member pivots in a plane perpendicular to a central axis of an axle extending through said drop-out to a position wherein said crook portion is in registry with said slot to close an open end of said slot to retain an axle therein; and said inner periphery being shaped such that said bottom portion curves upwardly toward said top portion, when said member is in registry with said slot, sufficiently to require a slight upward movement of said axle to enable said crook portion to be pivot out of registry with said slot, and wherein a lower tip of said inner periphery is spaced from an upper tip thereof a distance less than a diameter of said inner periphery, whereby gravity acting upon a retained axle against said member urges said member to remain in registry with said slot, said connecting means including a rivet extending through said flange and said drop-out and a spring washer mounted on said rivet and positioned between said flange and said drop-out.

* * * * *